United States Patent [19]
Becker

[11] 3,749,309
[45] July 31, 1973

[54] TRACTION PADS

[76] Inventor: Russell D. Becker, 1328 S. 96th St., West Allis, Wis.

[22] Filed: Jan. 18, 1971

[21] Appl. No.: 106,966

[52] U.S. Cl. .................................................. 238/14
[51] Int. Cl. ............................................ E01b 23/00
[58] Field of Search ........................................ 238/14

[56] References Cited
UNITED STATES PATENTS

| | | | |
|---|---|---|---|
| 1,325,088 | 12/1919 | Hall | 238/14 |
| 3,152,761 | 10/1964 | Vaughan, Jr. et al. | 238/14 |
| 3,425,624 | 2/1969 | Jacobs | 238/14 |
| 1,324,291 | 12/1919 | Austen | 238/14 |
| 1,375,666 | 4/1921 | Bauer | 238/14 |
| 1,354,826 | 10/1920 | Hall | 238/14 |
| 1,324,706 | 12/1919 | Walter | 238/14 |
| 1,432,447 | 10/1922 | Edgecomb | 238/14 |
| 3,350,013 | 10/1967 | Bergquist | 238/14 |
| 3,008,643 | 11/1961 | Tanner | 238/14 |

*Primary Examiner*—Gerald M. Forlenza
*Assistant Examiner*—Richard A. Bertsch
*Attorney*—Alter, Weiss & Whitesel

[57] ABSTRACT

Two traction pads are formed with lugs which bite into ice or snow. The pads are connected together by chains having a length such that the chains are taut when one pad is under a front wheel of an auto and the other pad is under the rear wheel of the auto. This way, the weight of the car on the front pad keeps the traction force of the rear wheels from flinging the traction pad out from under the wheels and behind the car.

1 Claim, 8 Drawing Figures

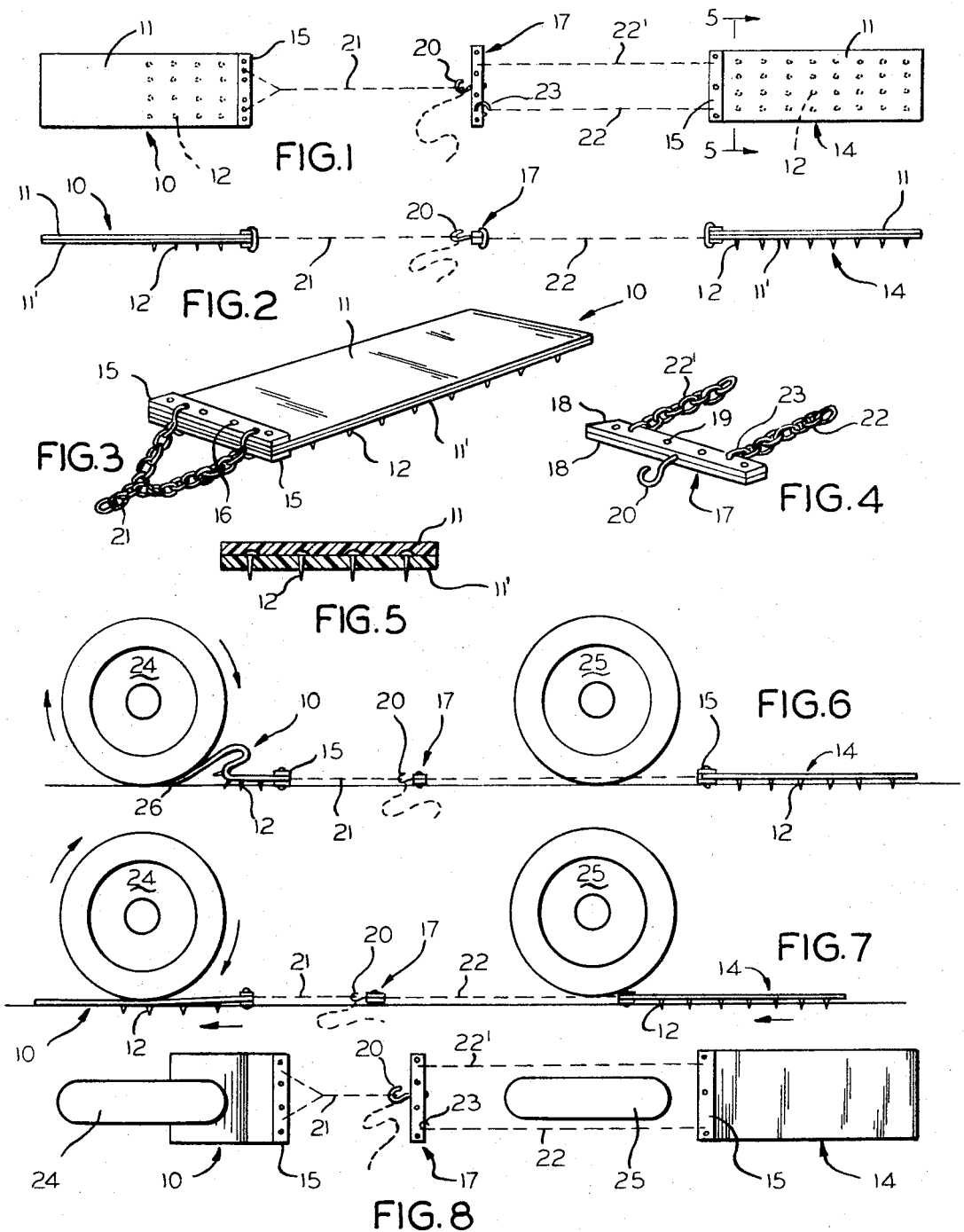
INVENTOR
RUSSELL D. BECKER

TRACTION PADS

Automobiles often lose traction in ice and snow. Usually they then become stuck and merely spin their wheels, digging in ever deeper. If traction can be established for even a brief instant, the auto will move forward enough to establish momentum and to move out of the hole that it is digging. Thereafter, the auto can move forward to a point from which it may move further, under its own power.

An object of my invention is to provide a device that may be placed into position for operation without requiring any special mechanical training or equipment.

Another object is to provide a device of the character described that may be folded into a compact unit that is easy to store and transport within the vehicle it is to service.

Still another object is to provide a device that is designed for application to vehicles of various sizes.

In keeping with an aspect of the invention, a device is provided that may be easily applied to the surface of the pavement adjacent to the wheels of the auto. The driving wheel mounts onto the surface of a portion of the device as the wheels spin. This pulls another portion of the device into position under the other wheel for providing a perfect traction.

The device is simple in construction, may be easily transported, and is positive in its performance and function.

Other and further objects of the invention will become more apparent as the description proceeds when taken in conjunction with the drawings, in which:

FIG. 1 is a top or plan view of the entire assembled device;

FIG. 2 is a side view of the assembled device as shown in FIG. 1;

FIG. 3 is a perspective view of the rear traction pad of the unit illustrating a single chain attachment;

FIG. 4 is a hook portion attached to the two chains which are in parallel relationship to one another for supporting the front traction pad;

FIG. 5 is a lateral cross-sectional view of the traction pad, taken at the line 5—5 in FIG. 1;

FIG. 6 is a schematic illustration of the inventive device applied to the wheels of the vehicle being serviced;

FIG. 7 is a view similar to that shown in FIG. 6, with the rear pad pulling the front pad when the drive wheel of the vehicle rotates in the direction shown by the arrows; and FIG. 8 is a top view of the assembled device being installed prior to the performance, as shown in FIG. 6.

Similar reference characters indicate corresponding parts and features throughout the several views. More particularly, the character 10 identifies the rear traction pad, which is here shown constructed of a pair of rubber pads or sheets 11 and 11' adherently attached to one another. The term "free lying pad" means that the pad lies on the ground and is not attached in any manner to the automobile, per se. A plurality of road gripping metalic lugs 12 extend through the lower pad 11', as shown in FIG. 5. Obviously, these traction pads may be constructed of any other type of pliable material and they may be made of any width or length.

By referring to FIG. 1 and 2, it will be noted that the rear traction pad 10 is preferably of the same size as the front pad 14.

The traction pads 10 and 14 are provided with metal banding plates is at the top and bottom surfaces, at one end thereof. The plates 15 are attached to the pads 10 and 14 by means of rivets or screws shown as 16.

An intermediate whiffletree link member 17 is here shown consisting of a pair of plates 18 held in engagement with one another by means of rivets or bolts 19 (see FIG. 4). This whiffletree link member 17 is equipped with a connector in the form of a hook 20 adapted to receive the chain 21 which is attached to the metal plates 15 of the rear traction pad 10, as shown in FIGS. 1 and 3. The hook 20 makes it possible to adjust the length of the chain 21. Two chains 22 and 22' extend from the link 17 to the front of the traction pad 14. A hook 23 on the chain 22 engages the link 17 (see FIG. 4).

In FIGS. 6, 7, and 8, the rear wheel of the vehicle is numbered 24 and the front wheel is numbered 25.

In operation, the rear wheel 24 of the vehicle skids and rotates in the direction shown by the arrows in FIG. 6. The rear pad 10 is folded to make contact with the wheel 24, as shown at 26. The chains 22 and 22' are placed on both sides of the front wheel 25 (see FIG. 8) and the hook 23 engages the link 17. The traction pad 14 is forward of the front wheel 25. The chain 21 engages the hook 20 on the link member 17 at a point which giverns the distance between the traction pads 10 and 14.

Before the drive wheel 24 revolves, the rear traction pad 10 is folded (as shown at 26, in FIG. 6) and placed under the edge of the tire. When power is applied to the wheel 24, it contacts the traction pad 10 and pulls it backward, thereby bringing the front traction pad 14 under the front wheel 25 and providing traction for causing the vehicle to move forward. The weight of the auto on the front pad prevents the rear pad from being flung out behind the car.

In the chosen embodiments of my invention, there are many parts and features not anticipated by the prior art. Although I have shown a specific construction and arrangement of the parts and features constituting my invention, many changes may be made without effecting the operativeness of the device. Therefore, the appended claims are to be construed to cover the equivalents which do not depart from the spirit or the scope of my invention.

I claim:

1. A pair of free lying traction pads, one of said pads being interconnected to a whiffletree by two chains, the other of said pads having a third chain which connects to a center point of said whiffletree, said chains having a combined length which approximately corresponds to the wheel base length of an auto, each of said free lying pads comprising a flexible sheet having ground gripping lugs thereon, means for removably attaching one of said two chains to an end of said whiffletree whereby said traction pad may be applied to an auto by detaching said one chain, initially laying said pads on the ground with one pad being in front of a front and another pad in front of a back wheel, with said one chain passing on one side of said front wheel and the other chain passing on the other side of said front wheel, and then reattaching said one chain, means for adjusting the length of said third chain to exactly correspond to the distance between the wheels on said auto, wherein said whiffletree interconnects said two chains in spaced parallel relationship,
said third chain running from the other of said pads, and
said length adjusting means comprises means for attaching said third chain to a connector at the center of said whiffletree at a selected link of said third chain.

* * * * *